(12) United States Patent
Jung et al.

(10) Patent No.: US 12,099,714 B2
(45) Date of Patent: Sep. 24, 2024

(54) METHOD OF PROVIDING USER INTERFACE AND FLEXIBLE DEVICE FOR PERFORMING SAME

(71) Applicant: Samsung Electronics Co., Ltd., Suwon-si (KR)

(72) Inventors: Ji-hyun Jung, Yongin-si (KR); Shi-yun Cho, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 17/209,828

(22) Filed: Mar. 23, 2021

(65) Prior Publication Data

US 2021/0208777 A1 Jul. 8, 2021

Related U.S. Application Data

(63) Continuation of application No. 15/120,326, filed as application No. PCT/KR2015/001690 on Feb. 23, 2015, now abandoned.

(30) Foreign Application Priority Data

Feb. 21, 2014 (KR) .................. 10-2014-0020819

(51) Int. Cl.
*G06F 3/04883* (2022.01)
*G06F 1/16* (2006.01)
*G06F 3/0481* (2022.01)
*G06F 3/14* (2006.01)
(Continued)

(52) U.S. Cl.
CPC ........ *G06F 3/04883* (2013.01); *G06F 1/1618* (2013.01); *G06F 1/1652* (2013.01); *G06F 1/1677* (2013.01); *G06F 3/0481* (2013.01); *G06F 3/14* (2013.01); *G06F 3/1423* (2013.01); *G06F 3/147* (2013.01); *G09G 5/14* (2013.01);
(Continued)

(58) Field of Classification Search
None
See application file for complete search history.

(56) References Cited

U.S. PATENT DOCUMENTS 8,543,166 B2 9/2013 Choi et al.
2008/0119237 A1* 5/2008 Kim .................. G06F 3/04886
455/566

(Continued)

FOREIGN PATENT DOCUMENTS

EP 2 674 834 A2 12/2013
EP 2 720 132 A2 4/2014
(Continued)

OTHER PUBLICATIONS

Chinese Office Action dated Aug. 22, 2018, issued in a counterpart Chinese application No. 201580020996.5.
(Continued)

*Primary Examiner* — Tamara T Kyle
*Assistant Examiner* — Koorosh Nehchiri
(74) *Attorney, Agent, or Firm* — Jefferson IP Law, LLP

(57) ABSTRACT

Disclosed is a method of providing a user interface in a flexible device, the method comprising: determining whether the device is released; displaying at least one user interface on the device on the basis of the determination; and receiving a touch input to the displayed user interface.

16 Claims, 19 Drawing Sheets

(51) Int. Cl.
*G06F 3/147* (2006.01)
*G09G 5/14* (2006.01)

(52) U.S. Cl.
CPC .............. *G06F 2203/04102* (2013.01); *G06F 2203/04803* (2013.01); *G09G 2354/00* (2013.01)

(56) References Cited

U.S. PATENT DOCUMENTS

| | | | |
|---|---|---|---|
| 2009/0122018 A1* | 5/2009 | Vymenets | G06F 3/0488 345/173 |
| 2010/0011291 A1* | 1/2010 | Nurmi | G06F 1/1652 715/702 |
| 2010/0056223 A1 | 3/2010 | Choi et al. | |
| 2010/0060548 A1* | 3/2010 | Choi | G06F 1/1652 345/1.3 |
| 2010/0141605 A1 | 6/2010 | Kang et al. | |
| 2011/0209102 A1 | 8/2011 | Hinckley et al. | |
| 2011/0227822 A1 | 9/2011 | Shai | |
| 2012/0005602 A1* | 1/2012 | Anttila | G06F 3/04886 715/761 |
| 2012/0036471 A1* | 2/2012 | Swanson | G06F 3/0482 715/779 |
| 2012/0212433 A1 | 8/2012 | Lee et al. | |
| 2013/0073999 A1* | 3/2013 | Swanson | G06F 3/0482 715/779 |
| 2013/0082972 A1 | 4/2013 | Kim et al. | |
| 2013/0086508 A1* | 4/2013 | Oguz | G06F 3/04883 715/779 |
| 2013/0127918 A1 | 5/2013 | Kang et al. | |
| 2013/0215041 A1 | 8/2013 | Kim et al. | |
| 2013/0215088 A1 | 8/2013 | Son et al. | |
| 2013/0265221 A1 | 10/2013 | Lee et al. | |
| 2013/0321264 A1* | 12/2013 | Park | G06F 3/01 345/156 |
| 2013/0321340 A1* | 12/2013 | Seo | G06F 1/1652 345/174 |
| 2014/0028596 A1* | 1/2014 | Seo | G06F 3/0487 345/173 |
| 2014/0028597 A1* | 1/2014 | Cho | G06F 3/04842 345/173 |
| 2014/0035869 A1 | 2/2014 | Yun et al. | |
| 2014/0049464 A1 | 2/2014 | Kwak et al. | |
| 2014/0062976 A1 | 3/2014 | Park et al. | |
| 2014/0101575 A1 | 4/2014 | Kwak et al. | |
| 2014/0189575 A1* | 7/2014 | Shuttleworth | H04M 1/724 715/781 |
| 2014/0189577 A1* | 7/2014 | Shuttleworth | G06F 3/0481 715/784 |
| 2014/0189578 A1 | 7/2014 | Shuttleworth et al. | |
| 2014/0189606 A1* | 7/2014 | Shuttleworth | G06F 3/04817 715/863 |
| 2014/0189607 A1* | 7/2014 | Shuttleworth | G06F 3/04883 715/863 |
| 2014/0189608 A1* | 7/2014 | Shuttleworth | H04M 1/67 715/863 |
| 2014/0310283 A1* | 10/2014 | Laligand | G06Q 50/01 707/737 |
| 2015/0220118 A1 | 8/2015 | Kwak et al. | |
| 2015/0325216 A1* | 11/2015 | Park | G06F 1/16 345/634 |
| 2015/0355728 A1* | 12/2015 | Cho | G06F 3/03 345/173 |
| 2017/0052566 A1* | 2/2017 | Ka | H04R 3/12 |
| 2018/0120954 A1 | 5/2018 | Seo et al. | |

FOREIGN PATENT DOCUMENTS

| | | |
|---|---|---|
| KR | 10-2010-0027501 A | 3/2010 |
| KR | 10-2011-0028650 A | 3/2011 |
| KR | 10-2012-0092036 A | 8/2012 |
| KR | 10-2012-0100148 A | 9/2012 |
| KR | 10-2013-0056674 A | 5/2013 |
| KR | 10-2013-0062210 A | 6/2013 |
| KR | 10-1273182 A | 6/2013 |
| KR | 10-2013-0083945 A | 7/2013 |
| WO | WO-2012108668 A2 * | 8/2012 ........... G06F 1/1616 |

OTHER PUBLICATIONS

European Office Action dated Jan. 15, 2020, issued in European Patent Application No. 15 751 961.2.
Korean Office Action dated Aug. 24, 2020, issued in Korean Patent Application No. 10-2014-0020819.

* cited by examiner

FIG. 18
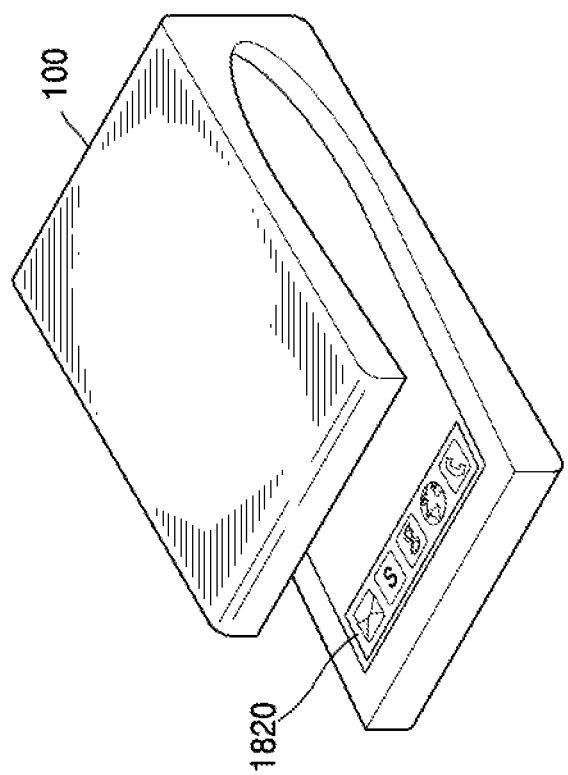
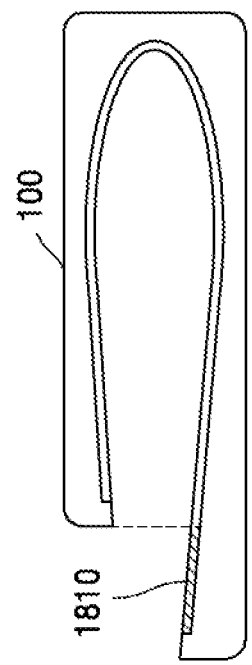

METHOD OF PROVIDING USER INTERFACE AND FLEXIBLE DEVICE FOR PERFORMING SAME

CROSS-REFERENCE TO RELATED APPLICATION(S)

This application is a continuation application of prior application Ser. No. 15/120,326, filed on Aug. 19, 2016, which application is a U.S. National Stage application under 35 U.S.C. § 371 of an International application number PCT/KR2015/001690, filed on Feb. 23, 2015, which is based on and which claimed priority under 35 U.S.C § 119(a) of a Korean patent application number 10-2014-0020819, filed on Feb. 21, 2014, in the Korean Intellectual Property Office, the disclosure of which is incorporated by reference herein in its entirety.

TECHNICAL FIELD

The present invention relates to a technology of providing a user interface in a flexible device.

BACKGROUND ART

A conventional device is a bar-type device of which a shape is not deformed and is capable of receiving an input through a touch or a button on a part of a front, rear, or side surfaces. When the conventional device is used, a user is interrupted by temporarily terminating an application that is currently being used in order to check many notifications that frequently occur. That is, a conventional notification method and check method have to terminate the application that is currently being used in order to check a notification, undergo several inconvenient procedures, and return to the application that is currently being used through several inconvenient procedures again. In order to another application related to the application that is currently being used, the user should instantly terminate the application that is currently being used and inconveniently execute the application again.

DETAILED DESCRIPTION OF THE INVENTION

Technical Problem

The present invention provides a method of providing a user interface by using a characteristic that a shape of a flexible device is deformed and a flexible device for providing a user interface by using a characteristic that a shape of the flexible device is deformed.

DESCRIPTION OF THE DRAWINGS

FIG. 18 is a diagram for describing a process of displaying a user interface on a specific portion when a user folds a flexible device, according to another embodiment.

BEST MODE

Figure 1A:
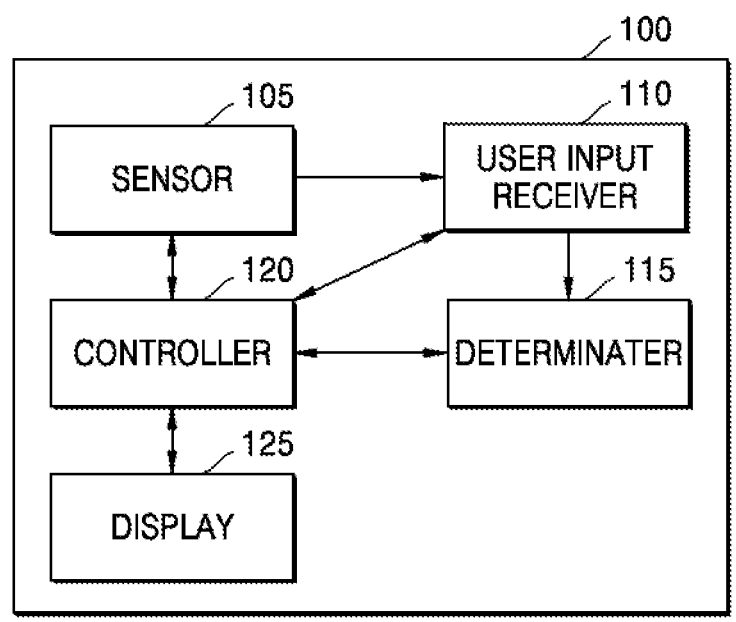
FIGS. 1A and 1B are diagrams of a flexible device according to various embodiments of the disclosure.

According to an aspect of the present invention, there is provided a method of providing a user interface in a flexible device, the method including determining whether the flexible device is released; displaying at least one user interface on the flexible device on the basis of the determination; and receiving a touch input with respect to the displayed at least one user interface.

The displaying includes: while the user interface is displayed, determining whether the flexible device is folded and released; and not displaying the user interface on a display on the basis of the determination.

The method may further include: determining whether a touch input in a first direction is received on the at least one user interface; and when it is determined that the touch input in the first direction is received, switching and displaying the displayed at least one user interface to another user interface.

The method may further include: determining whether a touch input in an opposite direction to the first direction is received; and when it is determined that the touch input in opposite direction to the first direction is received, switching and displaying another user interface to the displayed at least one user interface.

The method may further include: determining a boundary of a plurality of regions that are displayed; and displaying the plurality of regions according to the determined boundary.

The displaying of the at least one user interface may include: displaying the at least one user interface on a portion adjacent to the boundary.

The method may further include: determining whether a touch input toward another region from a predetermined region including the boundary is received; changing a location of the boundary according to the touch input toward another region from the predetermined region including the boundary; and displaying the plurality of regions according to the determined region.

The method may further include: determining whether a touch input in a second direction toward an outside of the at least one user interface is received on a single item included in the at least one user interface; and performing a function indicated by the single item based on the received touch input in the second direction toward the outside of the at least one user interface.

The displaying of the at least one user interface may include: determining whether the flexible device is asymmetrically folded; and when it is determined that the flexible device is asymmetrically folded, dividing the flexible device into a first surface and a second surface with respect to a folded boundary and displaying the at least one user interface on a part of the second surface that is not covered by the first surface of the flexible device.

According to another aspect of the present invention, there is provided a method of providing a notification service in a flexible device, the method including providing information indicative of a notification to a user; determining whether the flexible device is folded; while the information indicative of the notification is provided, when it is determined that the flexible device is folded, displaying a message corresponding to the information indicative of the notification on a display of the flexible device.

The displaying includes: determining whether the flexible device is released on the basis of a received input; and when it is determined that the flexible device is released, not displaying the message corresponding to the information indicative of the notification on the display.

According to another aspect of the present invention, there is provided a flexible device including a sensor configured to sense deformation of the flexible device; a user input receiver configured to receive an input from the sensor; a determiner configured to determine whether the flexible device is released based on the received input; a display configured to display a screen; and a controller configured to control the display to display at least one user interface on the basis of the determination.

While the user interface is displayed, the determiner may determine whether the flexible device is folded and released on the basis of the received input and the controller may control the display not to display the user interface on a display on the basis of the determination.

The determiner may determine whether a touch input in a first direction is received on the at least one user interface, and when the determiner determines that the touch input in the first direction is received, the controller may control the display to switch and display the displayed at least one user interface to another user interface.

The determiner may determine a boundary of a plurality of regions that are displayed, and the controller may control the display to display the plurality of regions according to the determined boundary.

The controller may control the display to display the at least one user interface on a portion adjacent to the boundary.

The determiner may determine whether a touch input toward another region from a predetermined region including the boundary is received, and the controller may change a location of the boundary according to the touch input toward another region from the predetermined region including the boundary and controls the display to display the plurality of regions according to the determined region.

The determiner may determine whether the flexible device is asymmetrically folded on the basis of the received input; and when the determiner determines that the flexible device is asymmetrically folded, the controller may divide the flexible device into a first surface and a second surface with respect to a folded boundary and control the display to display the at least one user interface on a part of the second surface that is not covered by the first surface of the flexible device.

The determiner may determine whether a touch input in a direction toward an outside of the at least one user interface is received on a single item included in the at least one user interface and the controller may control the display to perform a function indicated by the single item based on the received touch input in the direction toward the outside of the at least one user interface.

The determiner may determine whether the flexible device is asymmetrically folded on the basis of the received input; and when the determiner determines that the flexible device is asymmetrically folded, the controller may divide the flexible device into a first surface and a second surface with respect to a folded boundary and control the display to display the at least one user interface on a part of the second surface that is not covered by the first surface of the flexible device.

The determiner may determine whether a touch input in a direction toward an outside of the at least one user interface is received on a single item included in the at least one user interface and the controller may control the display to perform a function indicated by the single item on a screen of the flexible device based on the received touch input in the direction toward the outside of the at least one user interface.

According to another aspect of the present invention, there is provided a flexible device including a sensor configured to sense deformation of the flexible device; a notification provider configured to provide information indicative of a notification to a user; a user input receiver configured to receive an input from the sensor; a display configured to display a screen; a determiner configured to determine whether the flexible device is folded based on the received input; and a controller configured to control the display to display a message corresponding to the information indicative of the notification on the basis of the determination.

The determiner may determine whether the flexible device is released on the basis of the received input and when the determiner determines that the flexible device is released, the controller may control the display not to display the message corresponding to the information indicative of the notification.

According to another aspect of the present invention, a computer-readable recording medium has recorded thereon a computer program for executing the methods.

MODE OF THE INVENTION

Embodiments will be described in detail with reference to the accompanying drawings below. For better clear description of features of the embodiments, detailed descriptions of matters widely known to one of ordinary skill in the art to which the embodiments below pertain are omitted.

Figure 1B:
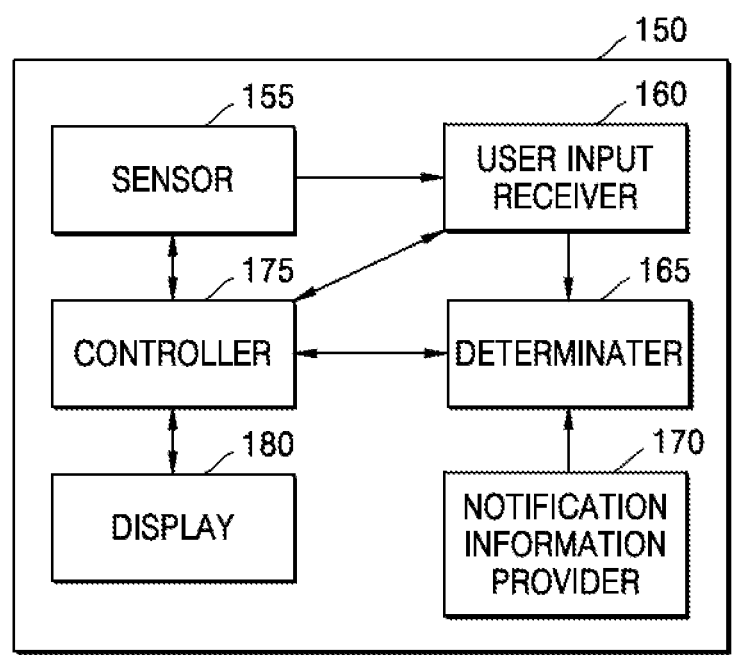

FIGS. 1A and 1B are diagrams of a flexible device according to various embodiments of the disclosure.

Referring to FIG. 1A, a flexible device 100 according to an embodiment may include a sensor 105, a user input receiver 110, a determiner 115, a controller 120, and a display 125.

The sensor 105 may sense deformation of the flexible device 100. For example, since the sensor 105 includes a bending sensor, the sensor 105 may sense a degree of bending the flexible device 100.

The user input receiver 110 may receive an input from the sensor 105. The user input receiver 110 may receive a touch input with respect to a user interface displayed on the display 125.

The determiner 115 may determine whether the flexible device 100 is released based on the input received from the sensor 105. Alternatively, the determiner 115 may determine whether the flexible device 100 is folded and released based on the input received from the sensor 105.

The controller 120 may control the display 125 to display at least one user interface on a screen of the flexible device 100 based on a determination of the determiner 115. That is, the controller 120 may control the display 125 to display one of a plurality of user interfaces if the determiner 115 determines that the flexible device 100 is released. Alternatively, the controller 120 may control the display 125 to display one of a plurality of user interfaces if the determiner 115 determines that the flexible device 100 is folded and released.

The display 125 may display a screen via which an application is executed and various user interfaces related to the application.

Another embodiment will be described below with reference to FIG. 1A.

A flexible device according to another embodiment may include a function of the flexible device 100 according to an embodiment. For brevity of description, a detailed description of the function is omitted.

The determiner 115 may determine whether the flexible device 100 is folded and released based on an input received from the sensor 105 while a user interface is displayed. The determiner 115 may also determine whether a touch input in a first direction is received on the user interface. In this regard, the first direction may be a direction parallel to a boundary line of a displayed screen. The determiner 115 may determine a boundary of a plurality of regions that will be displayed. The determiner 115 may determine whether a touch input toward another region from a predetermined region including the boundary is received. The determiner 115 may determine whether the flexible device 100 is asymmetrically folded based on the received input. The determiner 115 may also determine whether a touch input in a direction toward the outside of the user interface on a single item included in the user interface is received. In this regard, the direction toward the outside of the user interface on the single item may be a direction perpendicular to the boundary line of the screen.

The controller 120 may control the display 125 not to display the user interface if the determiner 115 determines that the flexible device 100 is folded and released while the user interface is displayed. When the determiner 115 also determines that the touch input in the first direction is received, the controller 120 may switch the displayed user interface to another user interface and control the display 125 to display another user interface. In addition, the controller 120 may control the display 125 to display the plurality of regions according to the determined boundary. The controller 120 may control the display 125 to display the user interface on a portion adjacent to the determined boundary. When the determiner 115 determines that the flexible device 100 is asymmetrically folded, the controller 120 may divide the flexible device 100 into a first surface and a second surface and control the display 125 to display the user interface on a part of the second surface of the flexible device 100 that is not covered by the first surface of the flexible device 100. The controller 120 may switch a location of the boundary according to the touch input toward another region from the predetermined region including the boundary and control the display 125 to display the plurality of regions according to the switched boundary. The controller 120 may control the display 125 to perform a function indicated by a single item based on the touch input toward the outside of the user interface.

A flexible device 150 according to an embodiment will be described below with reference to FIG. 1B.

The flexible device 150 may include a sensor 155, a user input receiver 160, a determiner 165, a notification information provider 170, a controller 175, and a display 180.

The sensor 155 may sense deformation of the flexible device 150. For example, since the sensor 155 includes a bending sensor, the sensor 155 may sense a degree of bending the flexible device 150. The user input receiver 160 may receive an input from the sensor 155.

The determiner 165 may determine whether the flexible device 150 is folded based on the input received from the sensor 155.

The notification information provider 170 may provide information indicative of a notification to a user. For example, when a notification event occurs, the notification information provider 170 may provide the information indicative of the notification as vibration and sound to the user. Alternatively, the notification information provider 170 may make the display 180 display the information indicative of the notification.

When the determiner 165 determines that the flexible device 150 is folded while the information indicative of the notification is provided, the controller 175 may control the display 180 to display a message corresponding to the information indicative of the notification.

The display 180 may display a screen via which an application is executed and various user interfaces related to the application.

Another embodiment will be described below with reference to FIG. 1B.

The flexible device 150 according to another embodiment may include a function of the flexible device 150 according to an embodiment described with reference to FIG. 1B. For brevity of description, a detailed description of the function is omitted.

The determiner 165 may determine whether the flexible device 150 is folded based on an input received from the sensor 155. When the determiner 165 determines that the flexible device 150 is folded, the controller 175 may control the display 180 not to display a message indicative of content of a notification.

Figure 2:
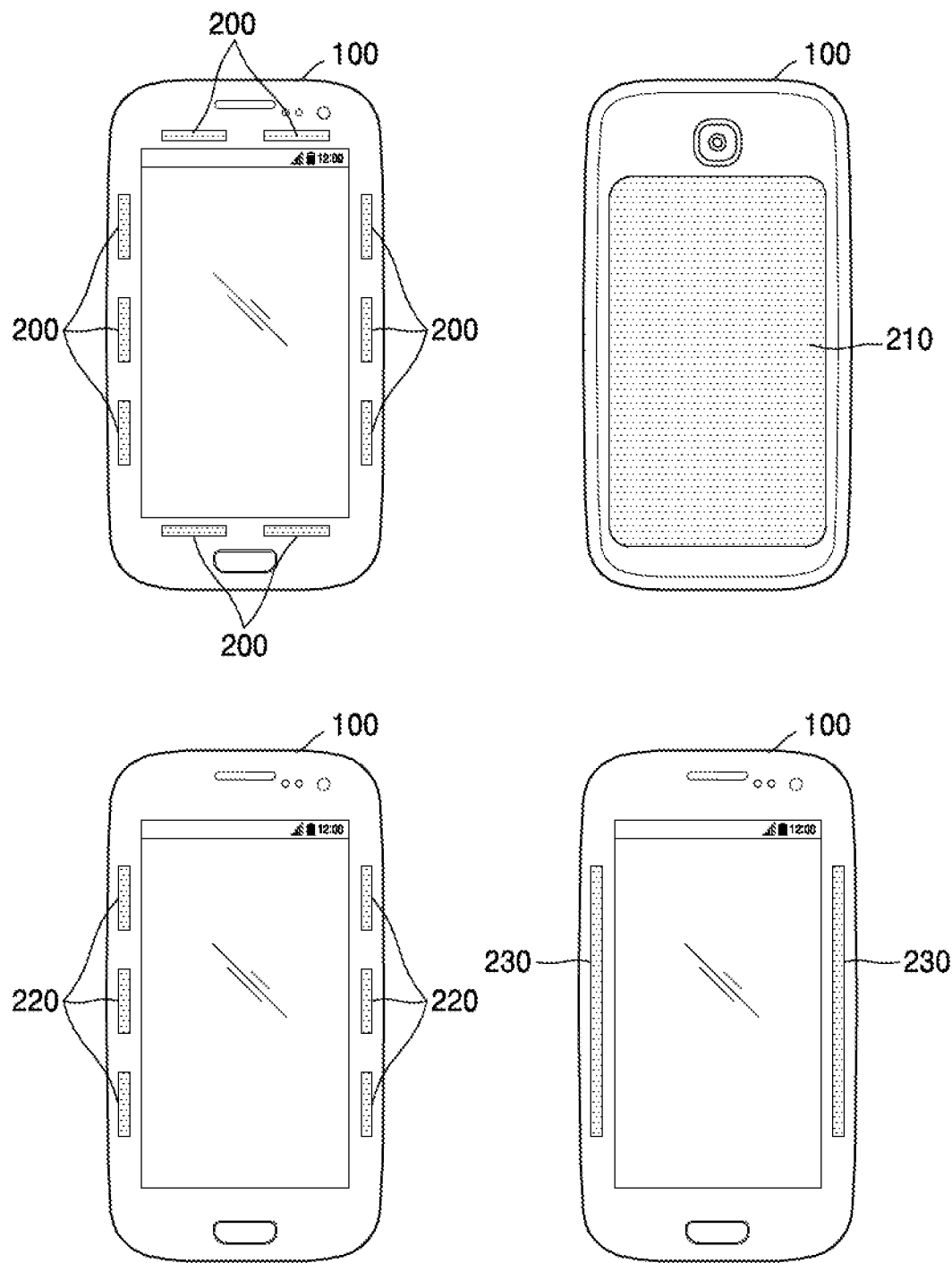
FIG. 2 is a diagram for describing a hardware configuration of a flexible device according to an embodiment.

FIG. 2 is a diagram for describing a hardware configuration of a flexible device according to an embodiment.

The flexible device 100 may include a flexible display formed of a deformable material. Thus, a user may deform shapes of the flexible devices 100 and 150.

The flexible device 100 may include a sensor such as a gyroscope sensor, a magnetic sensor, and an acceleration sensor capable of sensing a state change of the flexible device 100 and a bending sensor capable of sensing a degree of bending the flexible device 100.

Referring to FIG. 2, the flexible device 100 may include bending sensors 200-230.

The bending sensor 200 may be mounted on a side surface of a front portion of the flexible device 100 at the upper left location in FIG. 2 according to an embodiment. Alternatively, the bending sensor 200 may be mounted on a side surface of a rear portion of the flexible device 100.

The flexible bending sensor 210 may be mounted on the rear portion of the flexible device 100 at the upper right location in FIG. 2 according to an embodiment. However, when the bending sensor 210 is transparent, the bending sensor 210 may be mounted on the uppermost portion of the flexible device 100. Alternatively, the bending sensor 210 may be mounted below a flexible display block of the front portion of the flexible device 100. Several pairs of the bending sensors 220 may be mounted on sides facing the front portion of the flexible device 100 at the lower left location in FIG. 2 according to an embodiment. The bending sensors 230 may be mounted on a pair of sides facing the flexible device 100 at the lower right location in FIG. 2 according to an embodiment. However, the bending sensors 220 and 230 are not limited to being mounted on the front portion of the flexible device 100 and may be mounted on the rear portion thereof.

Figure 3:
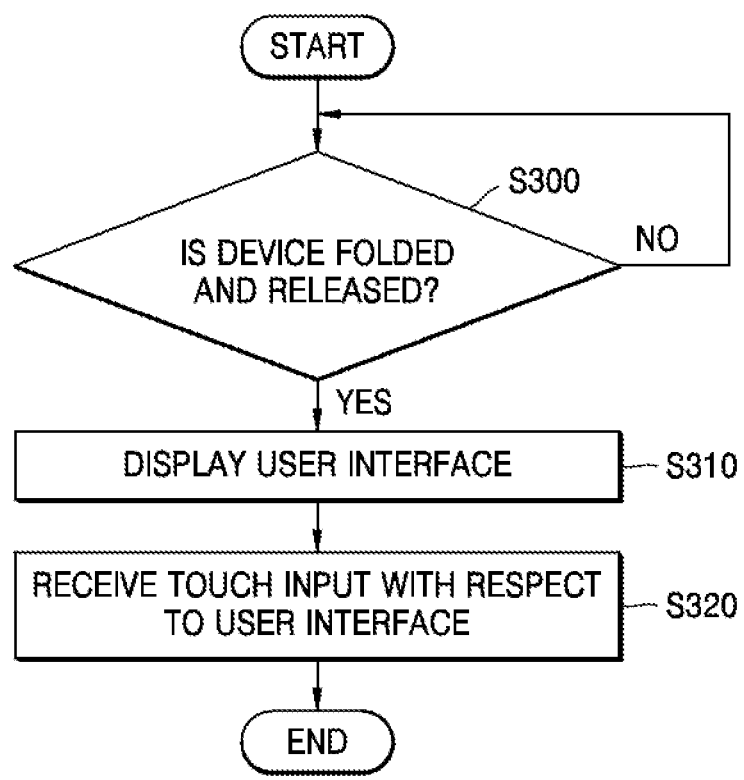
FIG. 3 is a flowchart of a method of providing a user interface, according to an embodiment.

FIG. 3 is a flowchart of a method of providing a user interface, according to an embodiment.

In operation S300, the flexible device 100 may determine whether the flexible device 100 is released. When the flexible device 100 determines that the flexible device 100 is not released, the flexible device 100 may determine whether the flexible device 100 is released again. Alternatively, the flexible device 100 may determine whether the flexible device 100 is folded and released.

In operation S310, when the flexible device 100 determines that the flexible device 100 is released, the flexible device 100 may display at least one user interface on a display unit of the flexible device 100.

In operation S320, the flexible device 100 may receive a touch input with respect to the displayed user interface.

Figure 4:
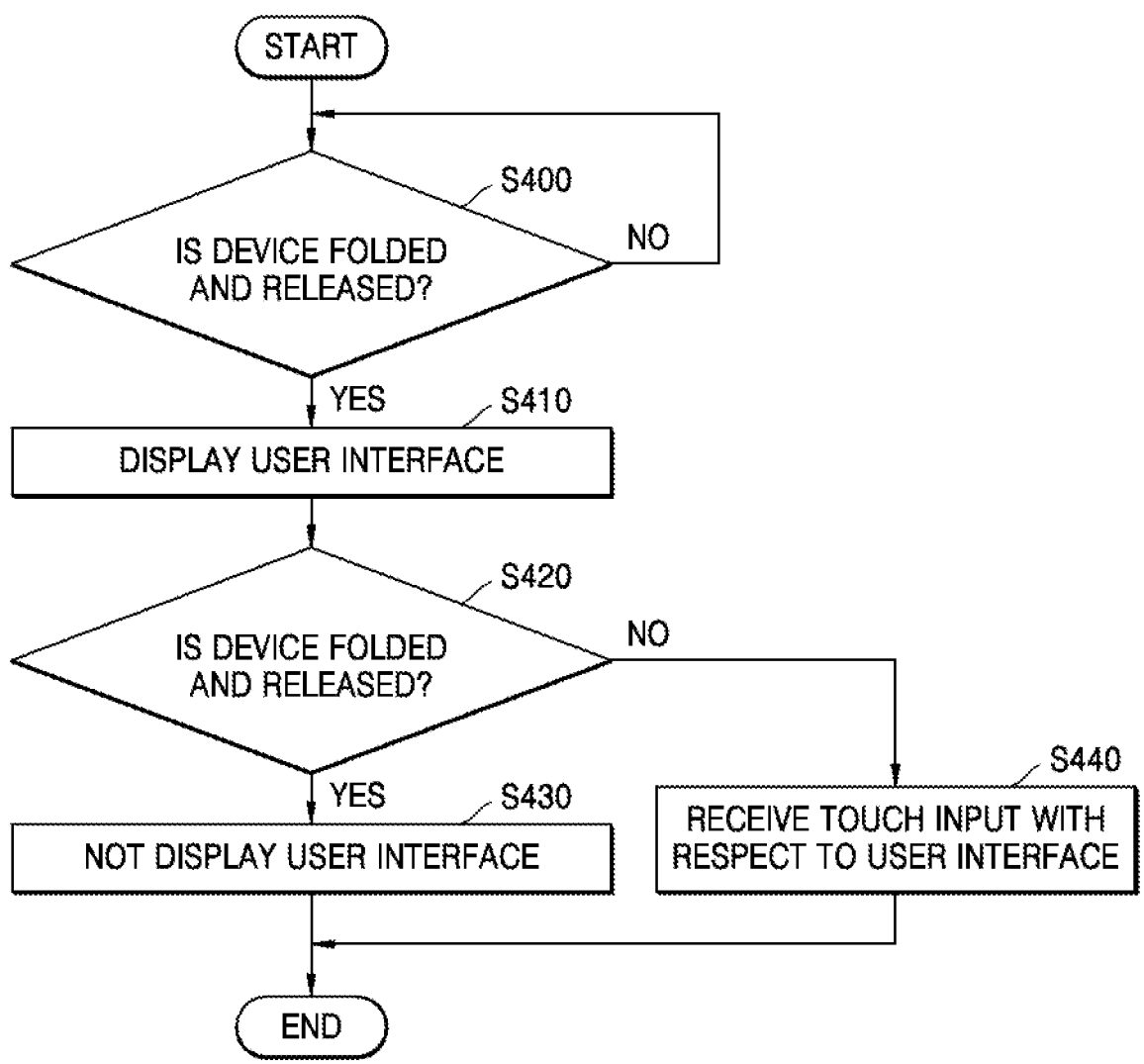
FIG. 4 is a flowchart of a method of providing a user interface, according to another embodiment.

FIG. 4 is a flowchart of a method of providing a user interface, according to another embodiment.

In operation S400, the flexible device 100 may determine whether the flexible device 100 is folded and released. When the flexible device 100 determines that the flexible device 100 is not folded and released, the flexible device 100 may determine whether the flexible device 100 is folded and released again.

In operation S410, when the flexible device 100 determines that the flexible device 100 is folded and released, the flexible device 100 may display a user interface on the display 125.

In operation S420, the flexible device 100 may determine whether the flexible device 100 is folded and released while the user interface is displayed on the display 125.

In operation S430, when the flexible device 100 determines that the flexible device 100 is folded and released, the flexible device 100 may not display the user interface on the display 125.

When the flexible device 100 determines that the flexible device 100 is not folded and released in operation S420, in operation S440, the flexible device 100 may receive a touch input with respect to the user interface.

Figure 5:
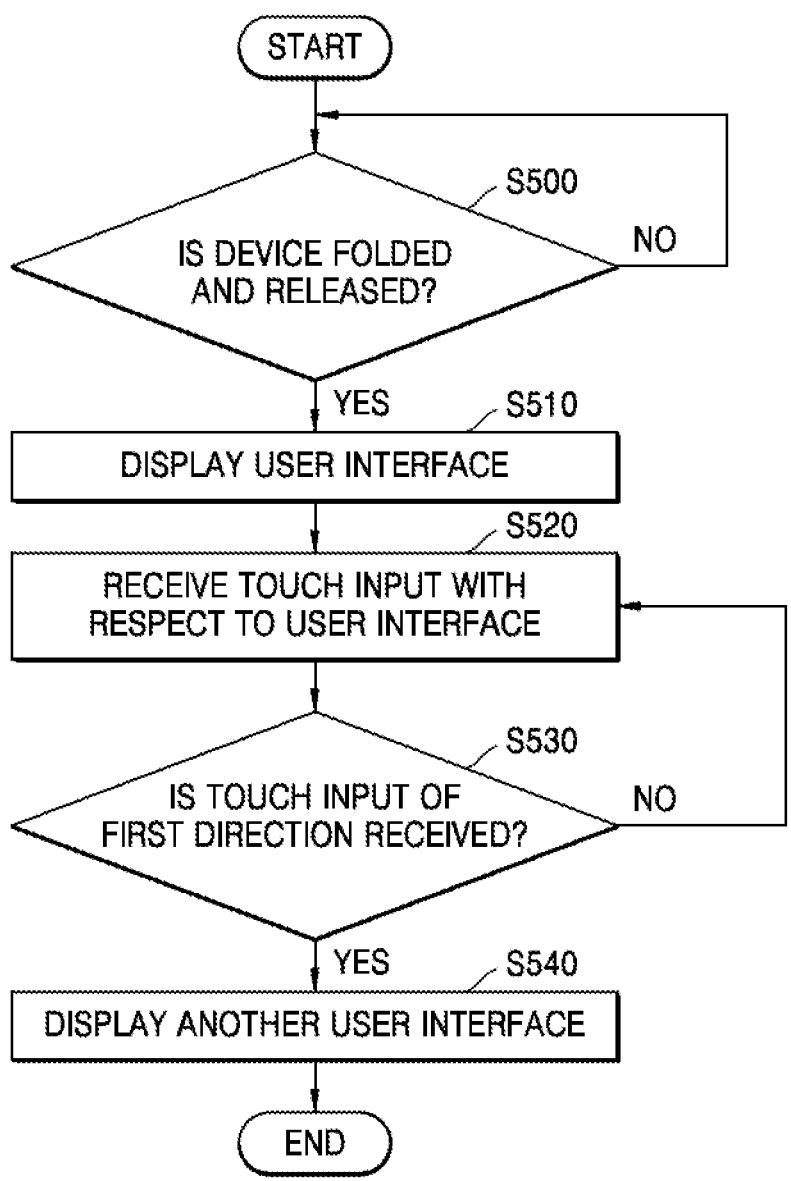
FIG. 5 is a flowchart of a method of providing a user interface, according to another embodiment.

FIG. 5 is a flowchart of a method of providing a user interface, according to another embodiment.

In operation S500, the flexible device 100 may determine whether the flexible device 100 is folded and released. When the flexible device 100 determines that the flexible device 100 is not folded and released, the flexible device 100 may determine whether the flexible device 100 is folded and released again.

In operation S510, when the flexible device 100 determines that the flexible device 100 is folded and released, the flexible device 100 may display a user interface on the display 125.

In operation S520, the flexible device 100 may receive a touch input with respect to the user interface.

In operation S530, the flexible device 100 may determine whether a touch input in a first direction is received on the user interface.

When the flexible device 100 determines that the touch input in the first direction is received, in operation S540, the flexible device 100 may switch the user interface to another user interface and display another user interface on the display 125.

When the flexible device 100 determines that the touch input in the first direction is not received in operation S530, the flexible device 100 may proceed with operation S520.

Figure 6:
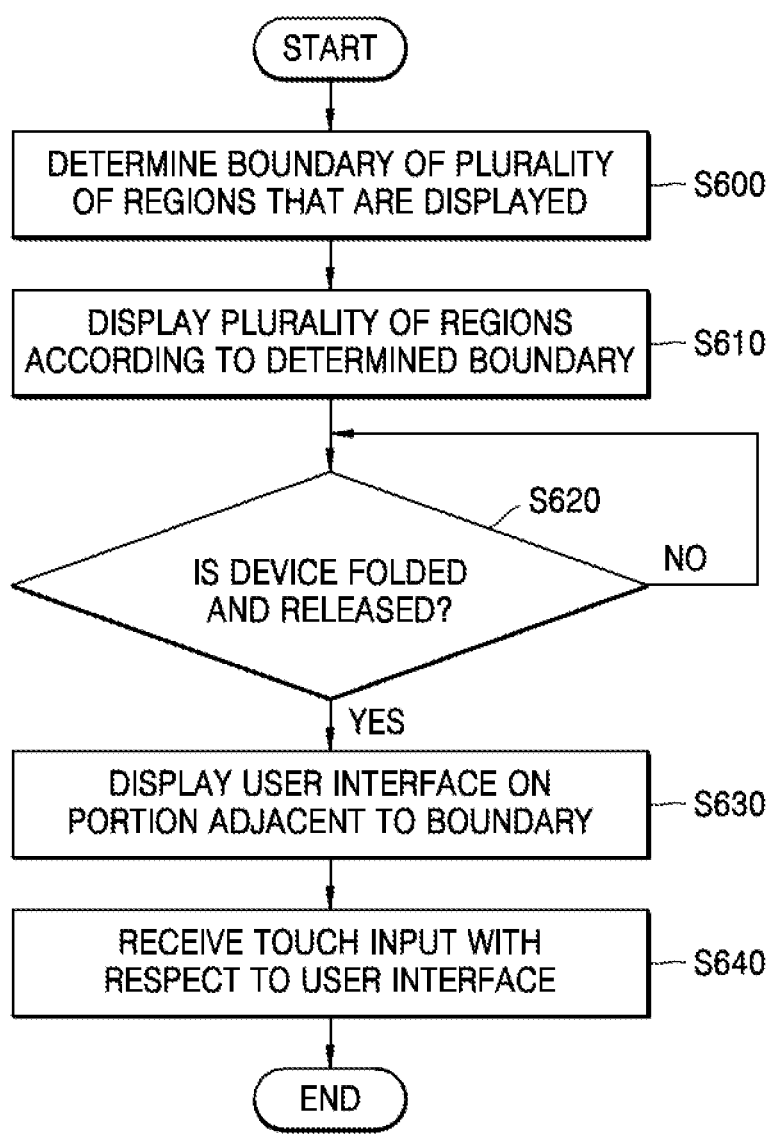
FIG. 6 is a flowchart of a method of providing a user interface, according to another embodiment.

FIG. 6 is a flowchart of a method of providing a user interface, according to another embodiment.

In operation S600, the flexible device 100 may determine a boundary of a plurality of regions that are displayed.

In operation S610, the flexible device 100 may display the plurality of regions according to the determined boundary.

In operation S620, the flexible device 100 may determine whether the flexible device 100 is folded and released. When the flexible device 100 determines that the flexible device 100 is not folded and released, the flexible device 100 may determine whether the flexible device 100 is folded and released again.

In operation S630, when the flexible device 100 determines that the flexible device 100 is folded and released, the flexible device 100 may display a user interface on a portion adjacent to the display 125.

In operation S640, the flexible device 100 may receive a touch input with respect to the user interface.

Figure 7:
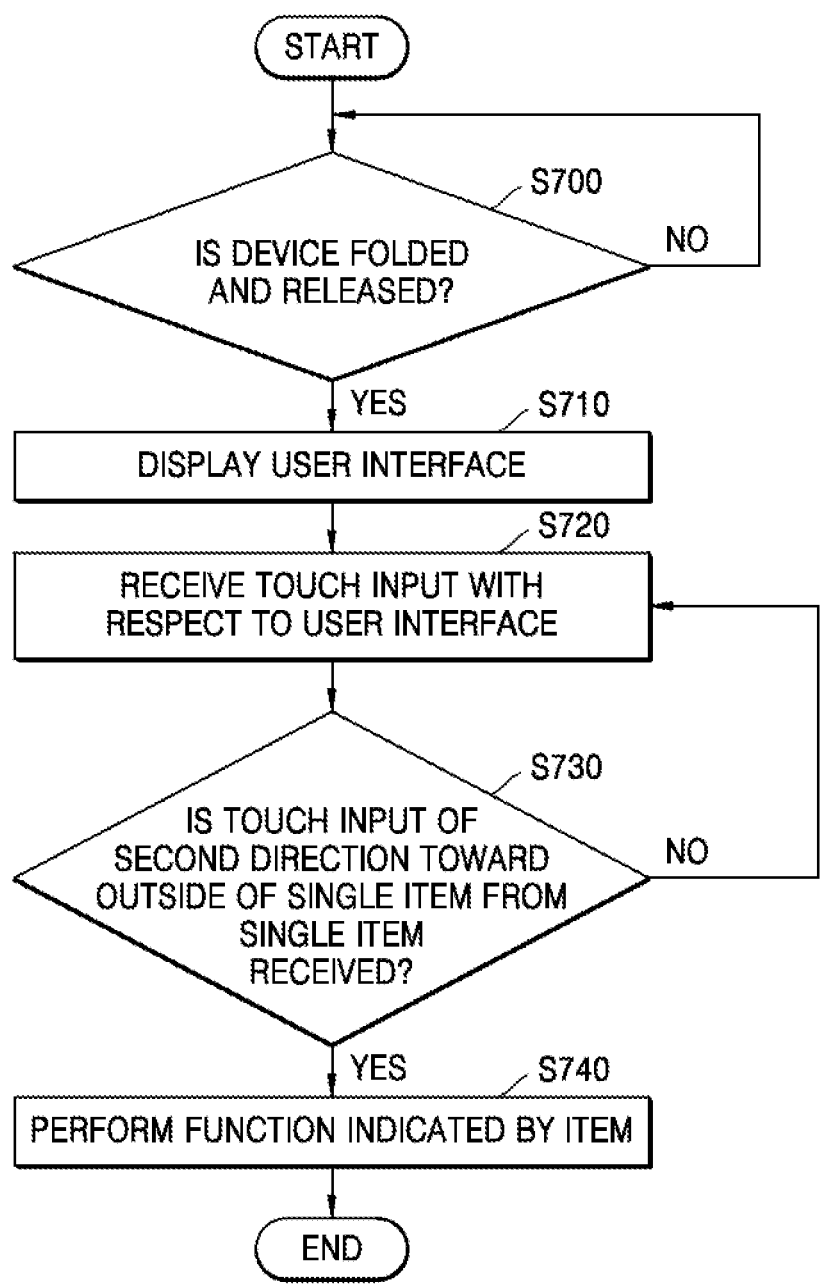
FIG. 7 is a flowchart of a method of providing a user interface, according to another embodiment.

FIG. 7 is a flowchart of a method of providing a user interface, according to another embodiment.

In operation S700, the flexible device 100 may determine whether the flexible device 100 is folded and released. When the flexible device 100 determines that the flexible device 100 is not folded and released, the flexible device 100 may determine whether the flexible device 100 is folded and released again.

In operation S710, the flexible device 100 may display a user interface on the display unit 125.

In operation S720, the flexible device 100 may receive a touch input with respect to the user interface.

In operation S730, the flexible device 100 may determine whether a touch input in a second direction toward the outside of a single item from the single item included in the user interface is received.

In operation S740, when the flexible device 100 determines that the touch input in the second direction is received, the flexible device 100 may perform a function indicated by an item of the flexible device 100.

Otherwise, the flexible device 100 determines that the touch input in the second direction toward the outside of a single item from the single item included in the user interface is not received in operation S730, the flexible device 100 may proceed with operation S720.

Figure 8:
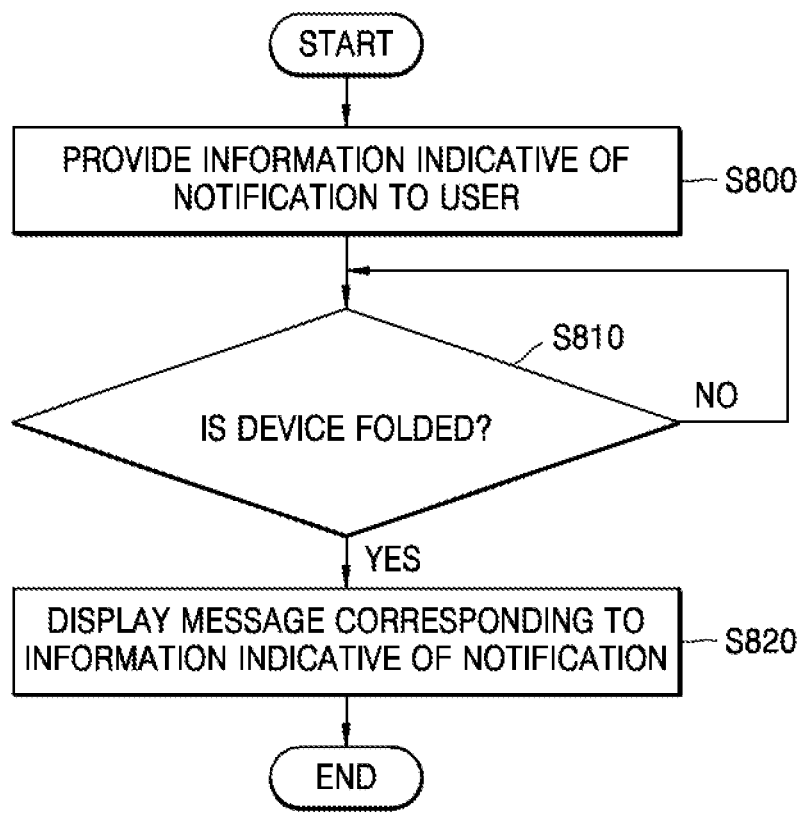
FIG. 8 is a flowchart of a method of providing a user interface, according to another embodiment.

FIG. 8 is a flowchart of a method of providing a user interface, according to another embodiment.

In operation S800, the flexible device 150 may provide information indicative of a notification to a user.

In operation S810, the flexible device 150 may determine whether the flexible device 100 is folded. When the flexible device 150 determines that the flexible device 150 is not folded, the flexible device 150 may determine whether the flexible device 100 is folded again.

In operation S820, when the flexible device 150 determines that the flexible device 150 is folded, the flexible device 150 may display a message corresponding to the information indicative of the notification.

Figure 9:
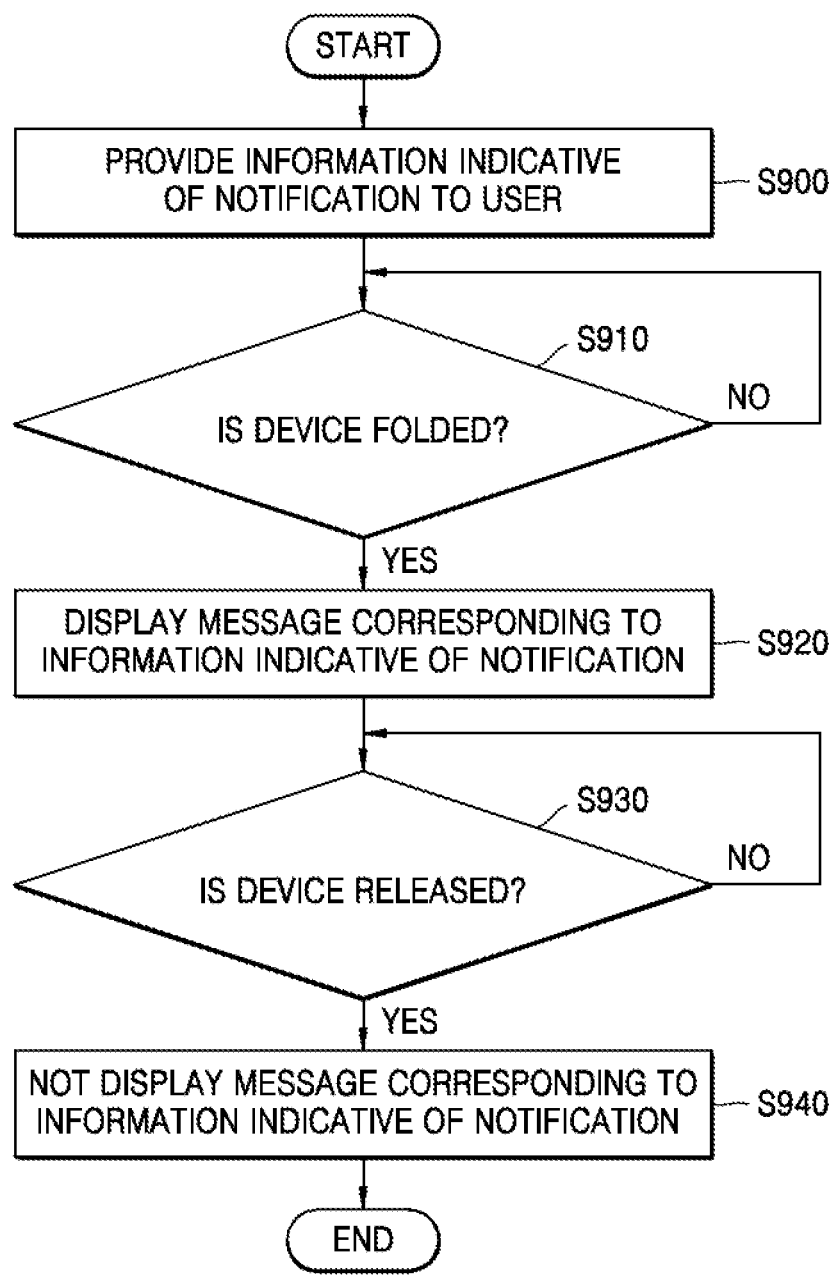
FIG. 9 is a flowchart of a method of providing a user interface, according to another embodiment.

FIG. 9 is a flowchart of a method of providing a user interface, according to another embodiment.

In operation S900, the flexible device 150 may provide information indicative of a notification to a user.

In operation S910, the flexible device 150 may determine whether the flexible device 100 is folded. When the flexible device 150 determines that the flexible device 150 is not folded, the flexible device 150 may determine whether the flexible device 100 is folded again.

In operation S920, when the flexible device 150 determines that the flexible device 150 is folded, the flexible device 150 may display a message corresponding to the information indicative of the notification.

In operation S930, the flexible device 150 may determine whether the flexible device 100 is released. When the flexible device 150 determines that the flexible device 150 is not released, the flexible device 150 may determine whether the flexible device 100 is released again.

In operation S940, when the flexible device 150 determines that the flexible device 150 is released, the flexible device 150 may not display the message corresponding to the information indicative of the notification.

Figure 10:
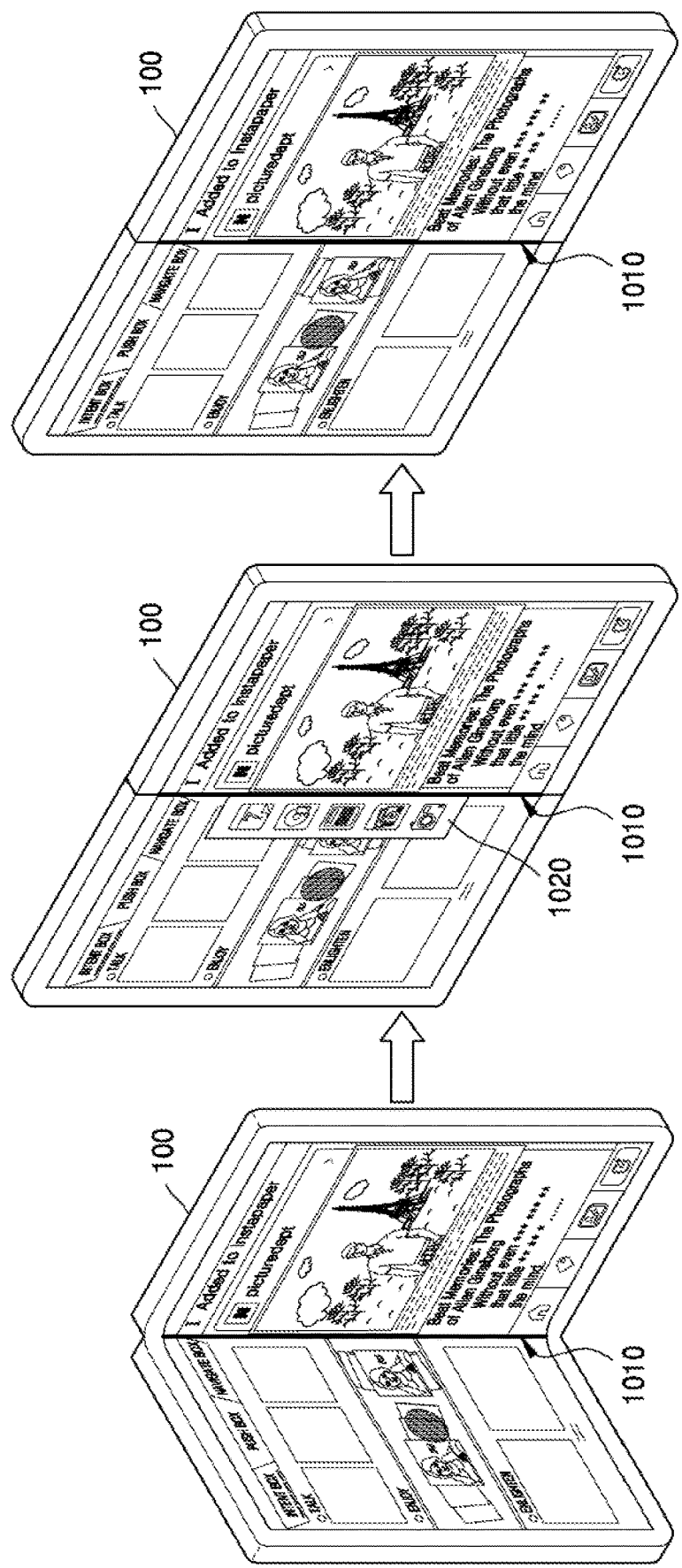
FIG. 10 is a diagram for describing a process of displaying a user interface in a flexible device, according to an embodiment.

FIG. 10 is a diagram for describing a process of displaying a user interface in a flexible device, according to an embodiment.

Referring to FIG. 10, a user executes an application on each of both screens that are adjacent to each other with respect to a screen boundary 1010 on the flexible device 100.

The user may perform a folding-flap input to the flexible device 100 while using the application. In this regard, the folding-flap input may mean an input of folding the flexible device 100 at more than a predetermined angle and instantly releasing the flexible device 100 while the user is using the flexible device 100. For example, the folding-flap input may mean an input of folding the flexible device 100 at 30 or more degrees and instantly releasing the flexible device 100 while the user is using the flexible device 100. If the flexible device 100 receives the folding-flap input, the flexible device 100 may display a user interface 1020 on a portion adjacent to the screen boundary 1010.

The user may perform an appropriate function of the flexible device 100 by using the displayed user interface 1020. If the user completely performs the appropriate function, the user may perform the folding-flat input to the flexible device 100.

If the flexible device 100 receives the folding-flap input, the flexible device 100 may remove the user interface 1020 displayed on the portion adjacent to the screen boundary 1010.

Figure 11:
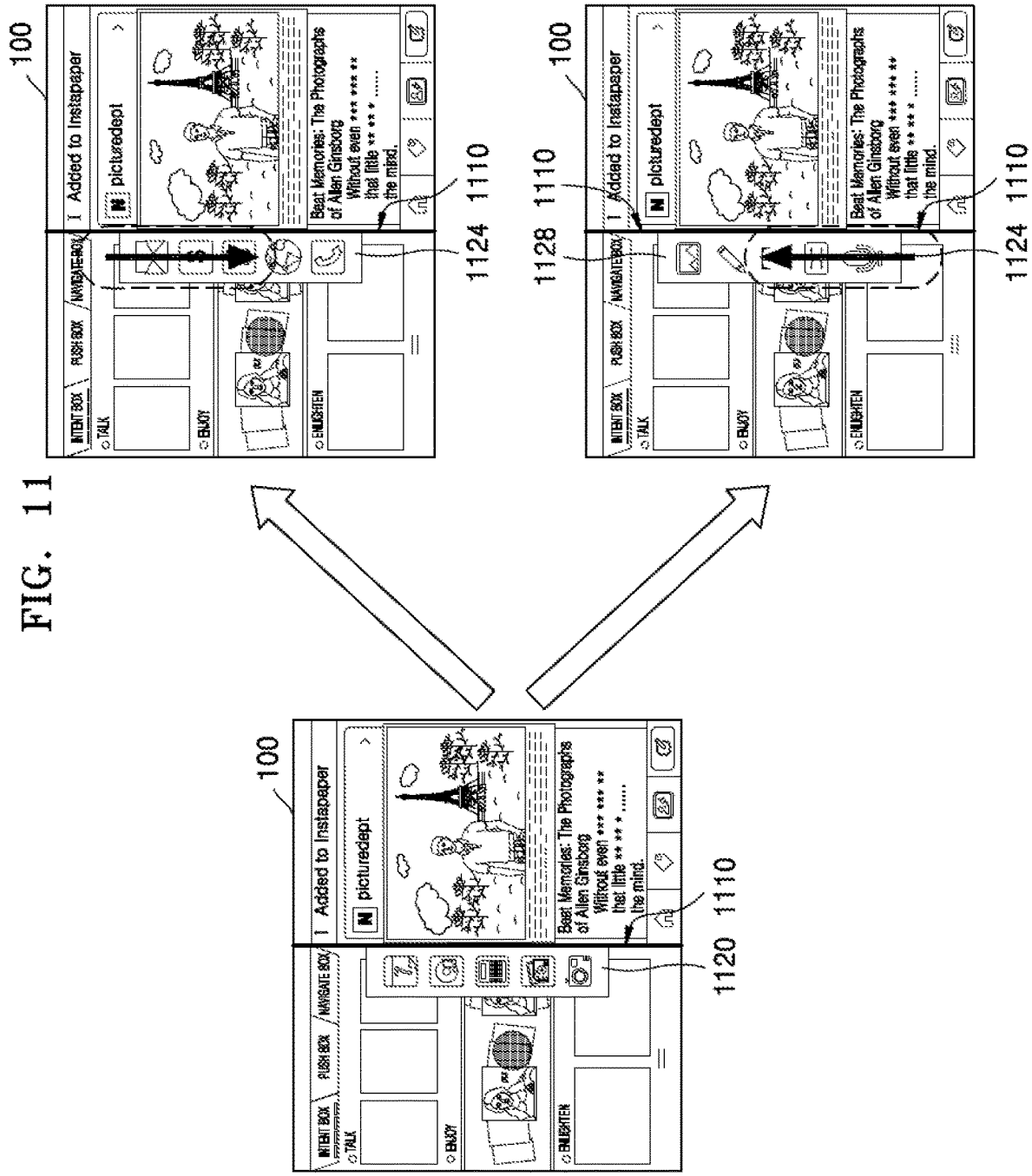
FIG. 11 is a diagram for describing a process of switching a user interface in a flexible device, according to an embodiment.

FIG. 11 is a diagram for describing a process of switching a user interface in a flexible device, according to an embodiment.

Referring to FIG. 11, a user may perform a folding-flat input to the flexible device 100 and display a user interface 1120 on a portion adjacent to a screen boundary 1110. The displayed user interface 1120 may be a recently used bar interface.

If the user moves the user's finger down from an upper boundary of the user interface 1120 on a display of the flexible device 100, as shown on the upper right of FIG. 11, the user interface 1120 may be switched to an application history bar 1124.

If the user moves the user's finger up from a lower boundary of the user interface 1120 on the display of the flexible device 100, as shown on a lower right of FIG. 11, the user interface 1120 may be switched to a toolset bar 1128. Meanwhile, when a display mode is changed to a full screen mode, the displayed user interface 1120 may move to the left of a screen or the uppermost end thereof.

Figure 12:
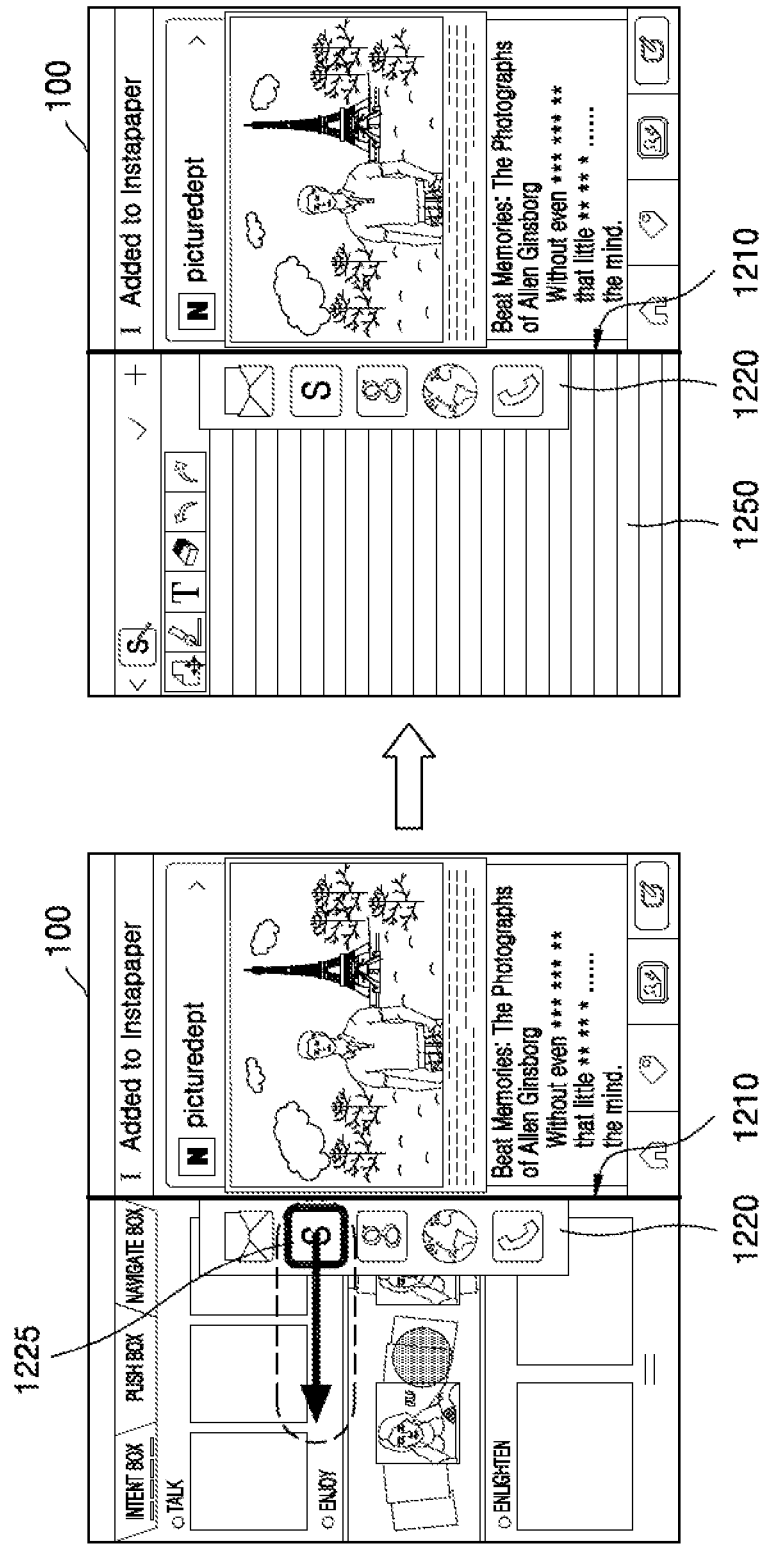
FIG. 12 is a diagram for describing a process of performing a function of an item included in a user interface, according to an embodiment.

FIG. 12 is a diagram for describing a process of performing a function of an item included in a user interface according to an embodiment.

Referring to FIG. 12, a user interface 1220 may be an application history bar or a toolset bar. In this regard, if a finger moves to a screen that is to be executed while a single item included in the user interface 1220 has been tapped, a function indicated by the single item may be performed on the screen. For example, in the present embodiment, if the finger moves to a screen 1250 that is executed by tapping a note application icon 1225 included in the application history bar, a note application may be executed and displayed on the screen 1250.

Figure 13:
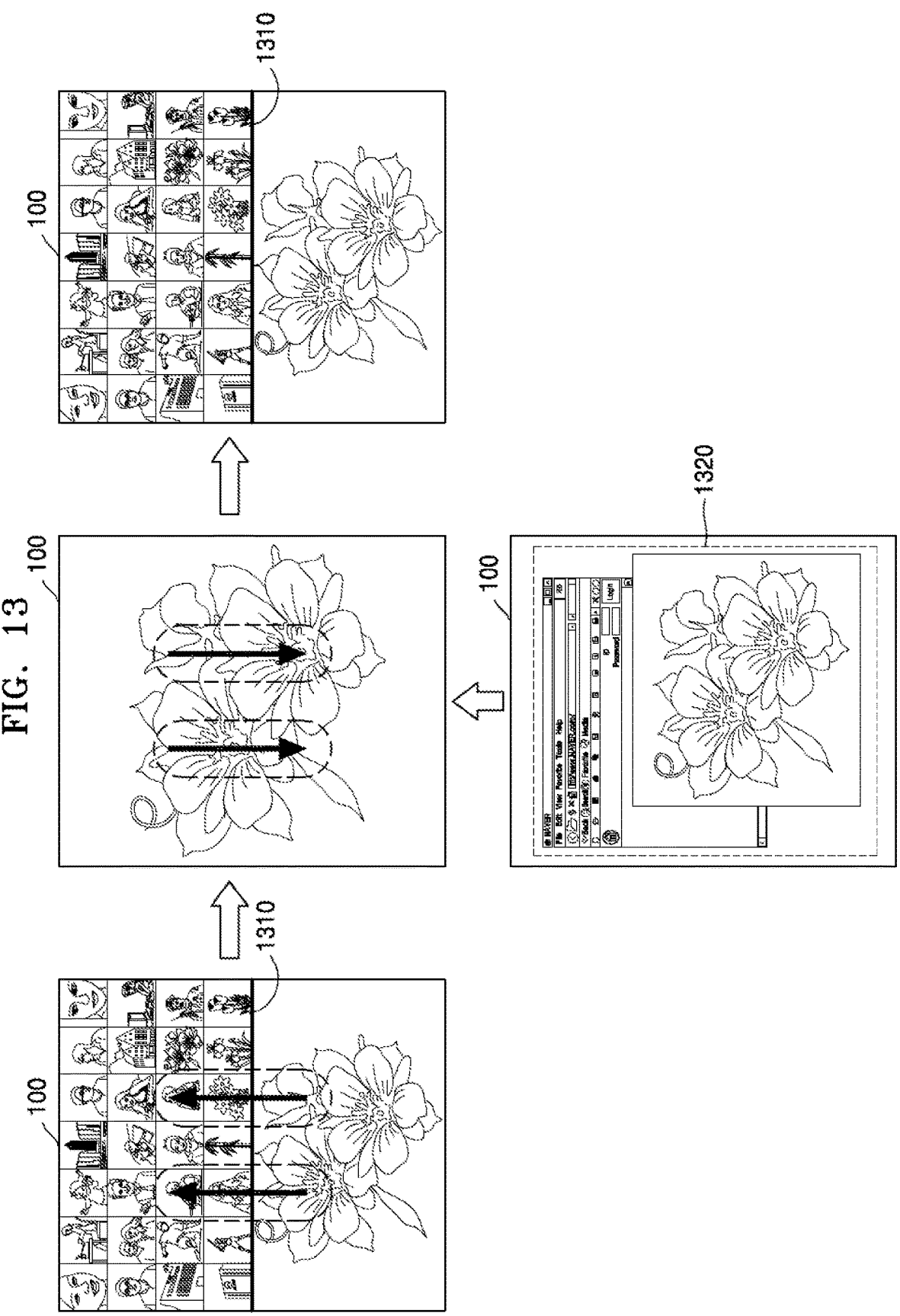
FIG. 13 is a diagram for describing a process of changing a screen mode and displaying an application history, according to an embodiment.

FIG. 13 is a diagram for describing a process of changing a screen mode and displaying an application history, according to an embodiment;

Referring to FIG. 13, a user executes a gallery application on the flexible device 100. In this regard, it is assumed that the user performs a folding-flap input to the flexible device 100 on the gallery application. The flexible device 100 may display a screen by changing a display mode to a split mode according to the folding-flat input. In the present embodiment, an image file may be displayed on a boundary upper end of a split screen in a thumbnail and a specific image file may be previewed on a boundary lower end of the split screen. In this regard, if the user moves user's two fingers up on a display, the display mode may be changed to a full screen mode. In this regard, a full screen may preview the specific image file. If the user moves user's two fingers down again on the full screen, the full screen mode may be changed to the split mode and thus the split screen may be displayed.

Meanwhile, if the user repeatedly moves user's fingers down while the full screen mode is used, an application screen executed on a background and a current screen may be displayed in an overlapping form 1320 like a bookshelf. The user may check a previously executed application through a screen displayed in the overlapping form 1320. In this regard, if the user moves user's fingers down, a current application may be changed to the application screen executed on the background.

Figure 14:
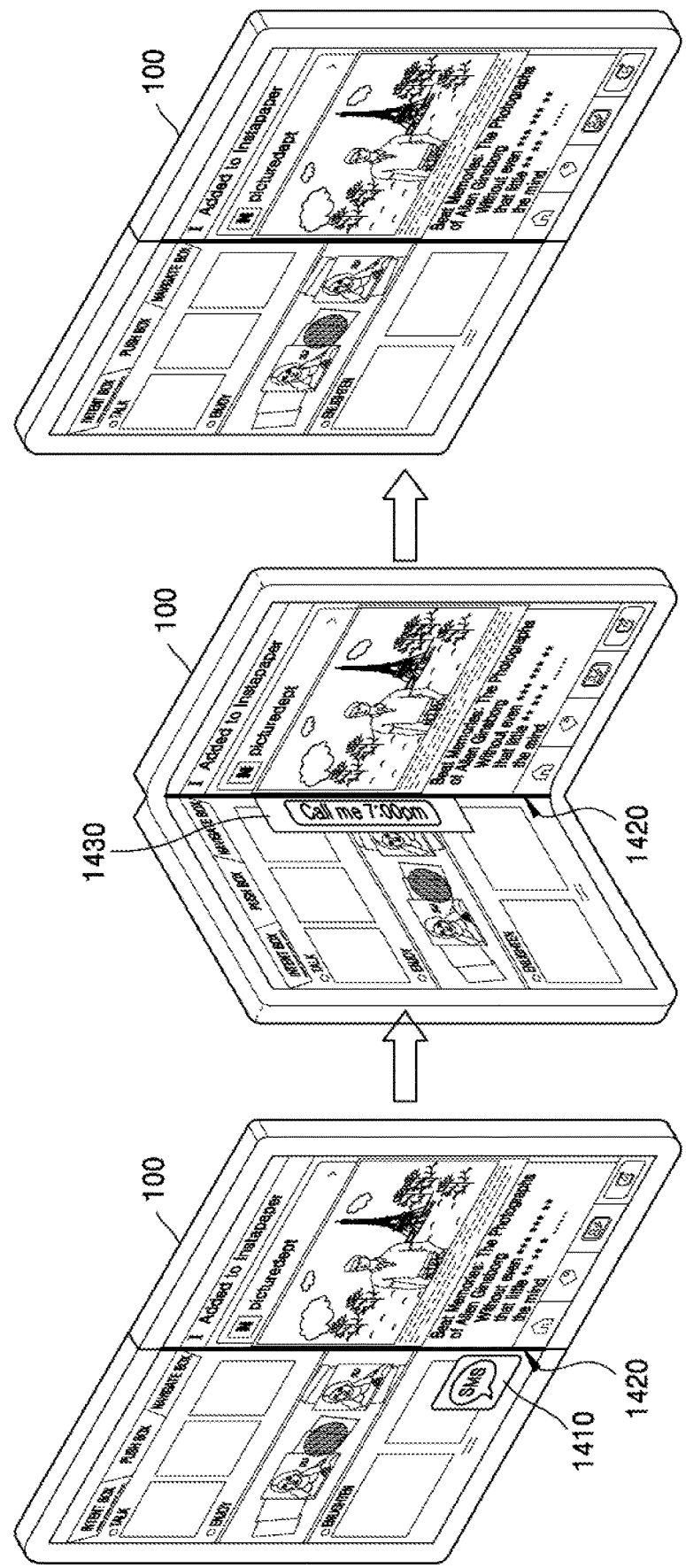
FIG. 14 is a diagram for describing a process of checking a real-time notification, according to an embodiment.

FIG. 14 is a diagram for describing a process of checking a real-time notification according to an embodiment.

Referring to FIG. 14, if a notification event occurs in the flexible device 100, the flexible device 100 may display a notification icon 1410. In this regard, if a user performs a folding-hold input to the flexible device 100, a popup 1430 indicative of a message corresponding to a notification may be displayed on a portion adjacent to a folded boundary 1420. However, the present embodiment is not limited thereto. If the user performs the folding-hold input to the flexible device 100, the flexible device 100 may check detailed content of the message corresponding to the notification by automatically executing an application in which the notification event occurs.

If the user checks the content of the message and performs a folding-hold release input to the flexible device 100, the popup 1430 may disappear. However, the present embodiment is not limited thereto. If the user performs the folding-hold release input to the flexible device 100, the flexible device 100 may end the application in which the notification event occurs and return to a previously used application.

In this regard, the folding-hold input may mean an input of folding the flexible device 100 at more than a predetermined angle and holding the flexible device 100 while the flexible device 100 is used, and the folding-hold release input may mean an input of folding the flexible device 100 at more than a predetermined angle and releasing the flexible device 100.

For example, the folding-hold input may mean an input of folding the flexible device 100 at 30 or more degrees and holding the flexible device 100 while the flexible device 100 is used, and the folding-hold release input may mean an input of folding the flexible device 100 at 30 or more degrees and releasing the flexible device 100.

Figure 15:
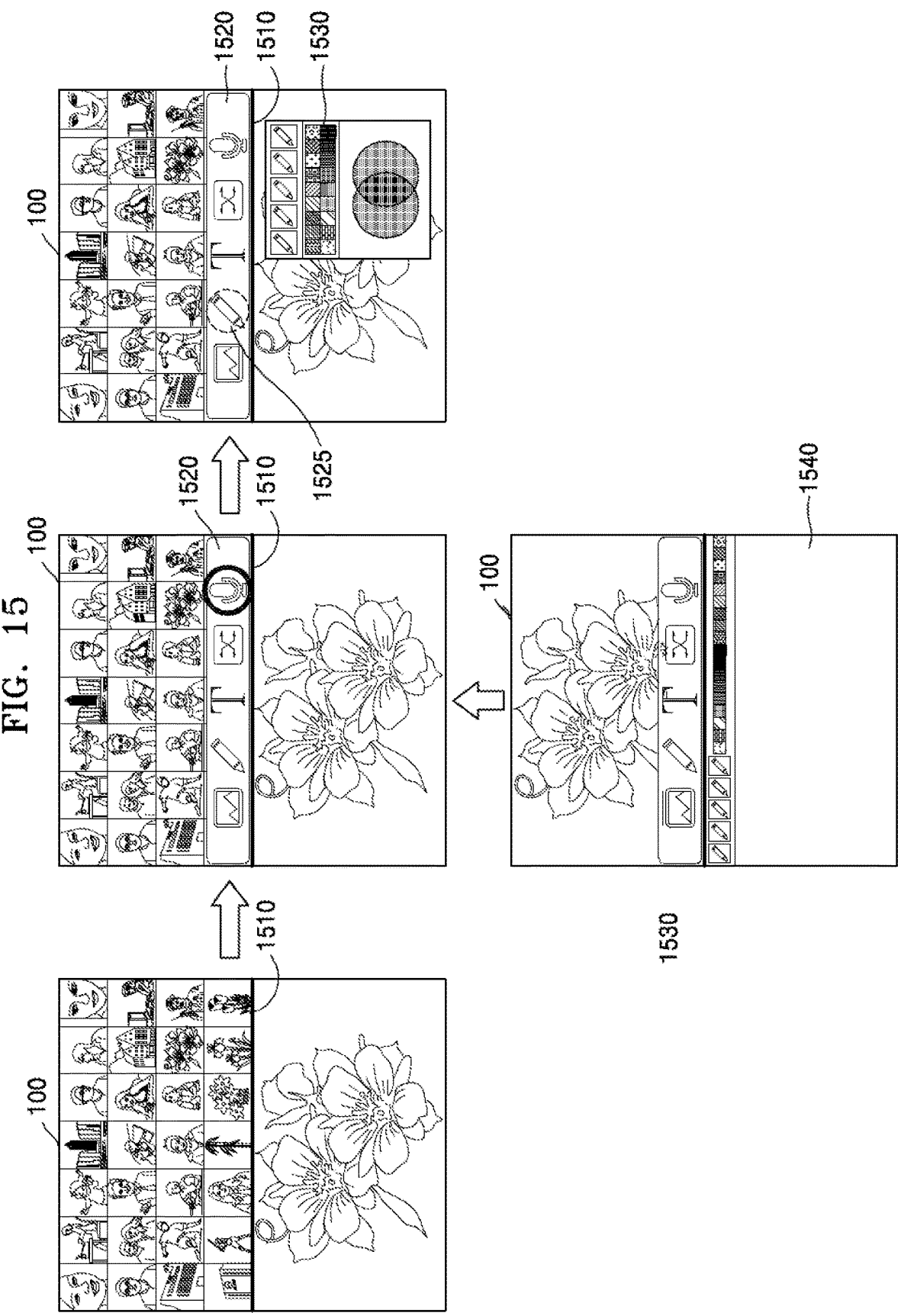
FIG. 15 is a diagram for describing a process in which a user uses a user interface in an executed gallery application, according to an embodiment.

FIG. 15 is a diagram for describing a process in which a user uses a user interface in an executed gallery application according to an embodiment.

Referring to FIG. 15, a user executes a gallery application in the flexible device 100. In this regard, it is assumed that the user performs a folding-flap input to the flexible device 100 on the gallery application. The flexible device 100 may display a screen by changing a display mode to a split mode according to the folding-flap input.

If the user performs the folding-flap input to the flexible device 100, a user interface 1520 may be generated. In this regard, it is assumed that the user interface 1520 may be a toolset bar. If the user taps one of items of the toolset bar by using a user's finger, a corresponding function may be performed. For example, if the user may tap a pencil icon 1525 by using the user's finger, a popup 1530 for selecting a color of a pencil that is to be colored may be executed. In this regard, the user may continuously tap the pencil icon 1525 twice by using the user's finger, and the popup 1530 for selecting the color of the pencil that is to be colored may expand, and thus the expanded popup 1530 may be displayed on a lower screen 1540 of a screen boundary 1510.

Figure 16:
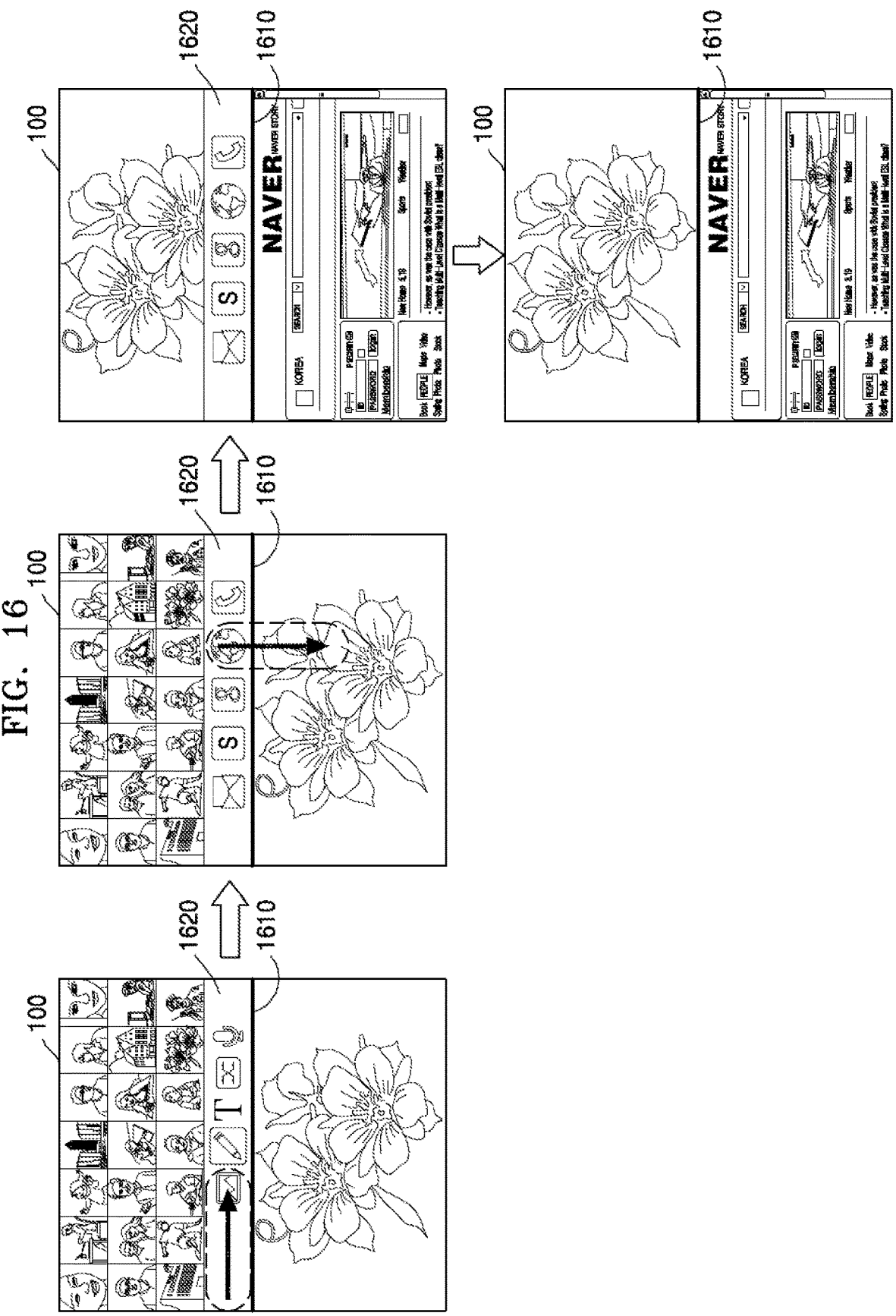
FIG. 16 is a diagram for describing a process in which a user uses a user interface in an executed gallery application, according to another embodiment.

FIG. 16 is a diagram for describing a process in which a user uses a user interface in an executed gallery application according to another embodiment.

Referring to FIG. 16, a user performs a folding-flap input to the flexible device 100. The flexible device 100 may receive the folding-flap input and display a user interface 1620. In this regard, the displayed user interface 1620 may be a toolset bar. In this regard, if the user moves a user's finger from the left of a left boundary of the user interface 1620 to the right, the user interface 1620 may be switched. In this regard, the displayed user interface 1620 may be an application history bar. Among icons included in the application history bar, if the user moves the user's finger from an icon indicative of the Internet below a boundary 1610, the Internet may be executed below the boundary 1610. In this regard, a gallery preview screen that was originally displayed on the lower end of the boundary 1610 may be moved to an upper end of the boundary 1610 and displayed. Thereafter, if the user performs the folding-flap input to the flexible device 100, the user interface 1620 may disappear.

Figure 17:
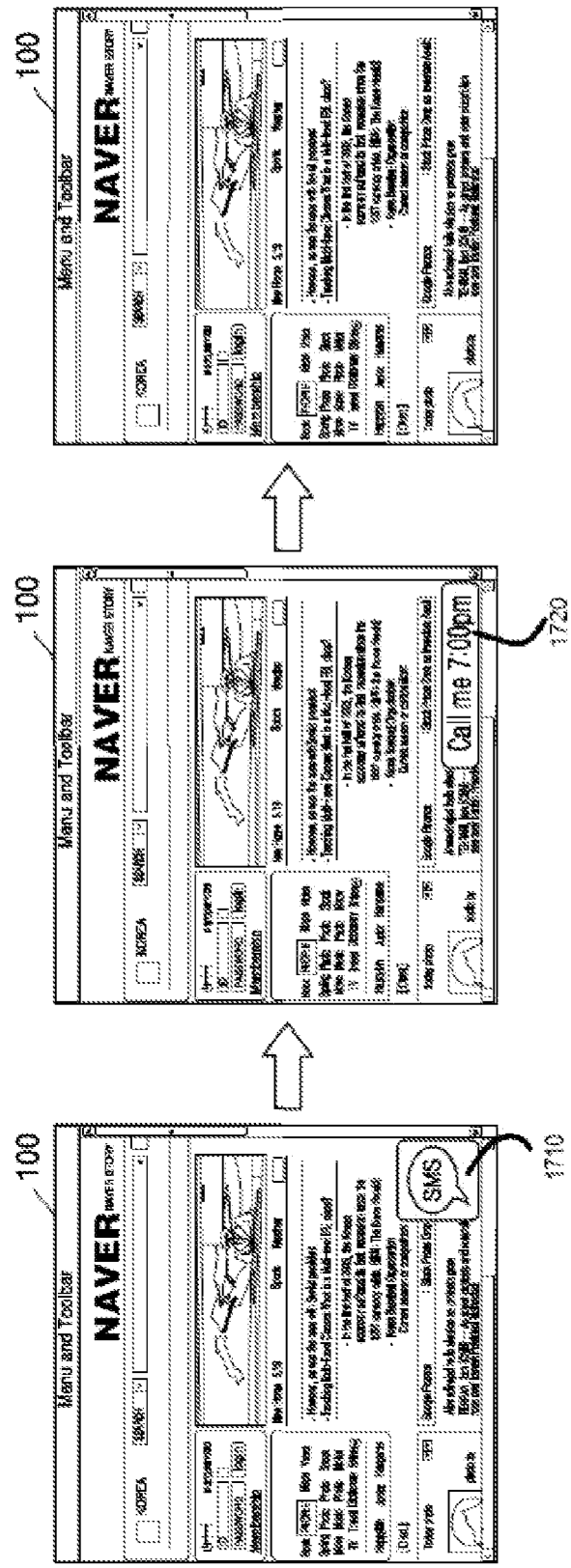
FIG. 17 is a diagram for describing a process in which a user checks a real-time notification, according to an embodiment.

FIG. 17 is a diagram for describing a process in which a user checks a real-time notification according to an embodiment.

If a notification event occurs, a notification icon 1710 may be displayed on the flexible device 100. In this regard, if a user performs a folding-hold input to the flexible device 100, a message 1720 simply indicative of notification event content may be displayed on a screen. However, the present embodiment is not limited thereto. If the user performs the folding-hold input to the flexible device 100, the flexible device 100 may automatically execute an application in which the notification event occurs so that the user may check detailed content of a message corresponding to a notification.

After the user checks the notification event content, if the user performs a folding-hold release input to the flexible device 100, the message 1720 indicative of the notification event content may disappear from the screen. However, the present embodiment is not limited thereto. If the user performs the folding-hold release input to the flexible device 100, the flexible device 100 may end the application in which the notification event occurs and return to a previously used application.

FIG. 18 is a diagram for describing a process of displaying a user interface on a specific portion when a user folds a flexible device according to another embodiment.

When a user performs a folding-flap input to the flexible device 100, the user may asymmetrically fold the flexible device 100. When the flexible device 100 is asymmetrically folded, a portion 1810 may not be covered. When the user releases the flexible device 100 again, a user interface 1820 may be displayed on the portion 1810 that is not covered.

The embodiments described above can be written as computer programs and can be implemented in general-use digital computers that execute the programs using a computer-readable recording medium.

Examples of the computer-readable recording medium include magnetic storage media (e.g., ROM, floppy disks, hard disks, etc.), optical recording media (e.g., CD-ROMs, or DVDs), etc.

While one or more embodiments have been described with reference to the figures, it will be understood by those of ordinary skill in the art that various changes in form and details may be made therein without departing from the spirit and scope as defined by the following claims. Therefore, it should be understood that embodiments described herein should be considered in a descriptive sense only and not for purposes of limitation.

The invention claimed is:

1. A method of providing at least one user interface on a flexible display of an electronic device, the method comprising:
    displaying, by the electronic device, first information on a first region of the flexible display and second information on a second region of the flexible display, the first information being associated with a first application and the second information being associated with a second application;
    while displaying the first information and the second information on the flexible display, identifying, by the electronic device, whether the electronic device is folded and released;
    based on the identifying that the electronic device is folded and released, displaying, by the electronic device, a user interface in a part of the first region displaying the first information and a part of the second region displaying the second information, the user interface including a plurality of application icons corresponding to a plurality of applications, respectively, the user interface displaying third information on the flexible display displaying the first information and the second information, the plurality of application icons comprising a third application icon corresponding to a third application different from the first application and the second application; and based on a first touch on the third application icon displayed in the user interface and a release of the first touch in the first region displaying the first information, changing, by the electronic device, the first information displayed on the first region of the flexible display into fourth information associated with the third application, wherein one side of the user interface merges with and extends along only a center portion of a boundary line between the first region and the second region, wherein a length of the one side of the user interface is less than a length of the boundary line, and wherein the method further comprises:
based on a second touch from one of an upper boundary of the user interface toward a lower boundary of the user interface or the lower boundary toward the upper boundary, switching, by the electronic device, the user interface to one of an application history bar or a toolset bar.

2. The method of claim 1, wherein the first touch comprises an input dragging the third application icon to the first region.

3. The method of claim 1, further comprising:
in response to identifying that the electronic device is folded and released while the third information is displayed, removing, by the electronic device, the displaying of the user interface comprising the plurality of application icons.

4. The method of claim 1, further comprising:
while the first information and the second information are displayed, identifying, by the electronic device, a third touch travelling toward a region from a predetermined region, the region being outside of the predetermined region and the boundary line;
changing, by the electronic device, a location of the boundary line according to the third touch; and
displaying, by the electronic device, the first information on the first region and the second information on the second region according to the changed location of the boundary line.

5. The method of claim 1, further comprising:
identifying, by the electronic device, whether the electronic device is asymmetrically folded; and
based on the identifying that the electronic device is asymmetrically folded, displaying, by the electronic device, fifth information on a part of a first surface that is not covered by a second surface, the first surface and the second surface of the electronic device facing each other with respect to an asymmetrically folded boundary.

6. The method of claim 1, further comprising:
while displaying the user interface comprising the plurality of application icons, identifying, by the electronic device, the second touch travelling in a first direction parallel to the boundary line; and
displaying, by the electronic device, fifth information on the first region according to the second touch,
wherein the fifth information comprises a fourth application icon corresponding to a fourth application, the fourth application icon being different from the third application icon, and wherein the method further comprises:
removing, by the electronic device, the displaying of the user interface comprising the plurality of application icons while displaying the fifth information.

7. An electronic device comprising:
a deformation sensor configured to sense a deformation of the electronic device;
at least one processor; and
a flexible display configured to display a screen,
wherein the at least one processor is configured to:
control the flexible display to display first information on a first region of the flexible display and display second information on a second region of the flexible display, the first information being associated with a first application and the second information being associated with a second application,
while the first information and the second information are displayed on the flexible display, identify, using the deformation sensor, whether the electronic device is folded and released,
based on the identifying that the electronic device is folded and released, control the flexible display to display, in a user interface in a part of the first region displaying the first information and a part of the second region displaying the second information, a plurality of application icons corresponding to a plurality of applications, respectively, the user interface displaying third information on the flexible display displaying the first information and the second information, the plurality of application icons comprising a third application icon corresponding to a third application different from the first application and the second application, and
based on a first touch on the third application icon displayed in the user interface and a release of the first touch in the first region displaying the first information, control the flexible display to change the first information displayed on the first region of the flexible display into fourth information associated with the third application,
wherein one side of the user interface merges with and extends along only a center portion of a boundary line between the first region and the second region,
wherein a length of the one side of the user interface is less than a length of the boundary line, and
wherein the at least one processor is further configured to:
based on a second touch from one of an upper boundary of the user interface toward a lower boundary of the user interface or the lower boundary toward the upper boundary, switch the user interface to of one of an application history bar or a toolset bar.

8. The electronic device of claim 7, wherein the first touch comprises an input dragging the third application icon to the first region.

9. The electronic device of claim 7, wherein the at least one processor is further configured to:
in response to identifying that the electronic device is folded and released while the third information is displayed, control the flexible display to remove the displaying of the user interface comprising the plurality of application icons.

10. The electronic device of claim 7, wherein the at least one processor is further configured to:
while the first information and the second information are displayed, identify a third touch travelling toward a region from a predetermined region, the region being outside of the predetermined region and the boundary line, change a location of the boundary line according to the second third touch, and
control the flexible display to display the first information on the first region and the second information on the second region according to the changed location of the boundary line.

11. A non-transitory computer-readable recording medium configured to store at least one computer program including instructions which, when executed by at least one processor, cause the at least one processor to perform the method of claim 1.

12. The electronic device of claim 7, wherein the at least one processor is further configured to:
identify whether the electronic device is asymmetrically folded, and
based on the identifying that the electronic device is asymmetrically folded, control the flexible display to display fifth information on a part of a first surface that is not covered by a second surface, the first surface and the second surface of the electronic device facing each other with respect to an asymmetrically folded boundary.

13. The electronic device of claim 7,
wherein the at least one processor is further configured to:
while displaying the user interface comprising the plurality of application icons, identify the second touch travelling in a first direction parallel to the boundary line, and
control the flexible display to display fifth information on the first region according to the second touch,
wherein the fifth information comprises a fourth application icon corresponding to a fourth application, the fourth application icon being different from the third application icon, and
wherein the at least one processor is further configured to:
while displaying the fifth information, control the flexible display to remove the user interface comprising the plurality of application icons from the flexible display.

14. The method of claim 1, wherein the third application comprises at least one of applications included in the application history bar or at least one of applications included in the toolset bar.

15. The method of claim 14, further comprising:
based on a direction of an input contained within a user interface displaying the user interface comprising the plurality of application icons, switching the displaying of the third application between the applications included in the application history bar and the applications included in the toolset bar.

16. The method of claim 1, wherein the identifying of whether the electronic device is folded and released comprises:
identifying that the flexible display is, after being folded 30 degrees or more in a direction of an open state to a closed state, instantly released to the open state.

* * * * *